(12) United States Patent
Voth

(10) Patent No.: US 8,999,223 B2
(45) Date of Patent: Apr. 7, 2015

(54) DEVICE AND METHOD FOR PRODUCING LABELED PLASTIC CONTAINERS

(75) Inventor: Klaus Voth, Obertraubling (DE)

(73) Assignee: Krones AG, Neutraubling (DE)

( * ) Notice: Subject to any disclaimer, the term of this patent is extended or adjusted under 35 U.S.C. 154(b) by 292 days.

(21) Appl. No.: 13/580,400

(22) PCT Filed: Jan. 13, 2011

(86) PCT No.: PCT/EP2011/000125
§ 371 (c)(1),
(2), (4) Date: Oct. 16, 2012

(87) PCT Pub. No.: WO2011/103942
PCT Pub. Date: Sep. 1, 2011

(65) Prior Publication Data
US 2013/0037997 A1 Feb. 14, 2013

(30) Foreign Application Priority Data

Feb. 23, 2010 (DE) .......................... 10 2010 002 246

(51) Int. Cl.
B29C 49/24 (2006.01)
B29C 49/36 (2006.01)
B29C 49/78 (2006.01)

(52) U.S. Cl.
CPC ................ B29C 49/24 (2013.01); B29C 49/36 (2013.01); B29C 49/78 (2013.01); B29C 2049/2412 (2013.01)

(58) Field of Classification Search
None
See application file for complete search history.

(56) References Cited

U.S. PATENT DOCUMENTS 5,039,298 A * 8/1991 Takakusaki et al. .......... 425/504
6,436,330 B1 8/2002 Winter

FOREIGN PATENT DOCUMENTS

| DE | 19806647 A1 | 8/1999 |
| DE | 19819731 A1 | 11/1999 |
| DE | 102007014870 A1 | 10/2008 |
| WO | WO 2008116525 A2 | 10/2008 |

OTHER PUBLICATIONS

European Patent Office, International Search Report in International Patent Application No. PCT/EP2011/000125 (May 20, 2011).

* cited by examiner

Primary Examiner — Monica Huson
(74) Attorney, Agent, or Firm — Leydig, Voit & Mayer, Ltd.

(57) ABSTRACT

A device for producing labeled plastic containers includes a blowing wheel including a plurality of blow molds each being configured to mold one of the containers. A labeling device is disposed in a region of the blowing wheel and is configured to label the containers while the containers are circulating on the blowing wheel.

19 Claims, 1 Drawing Sheet

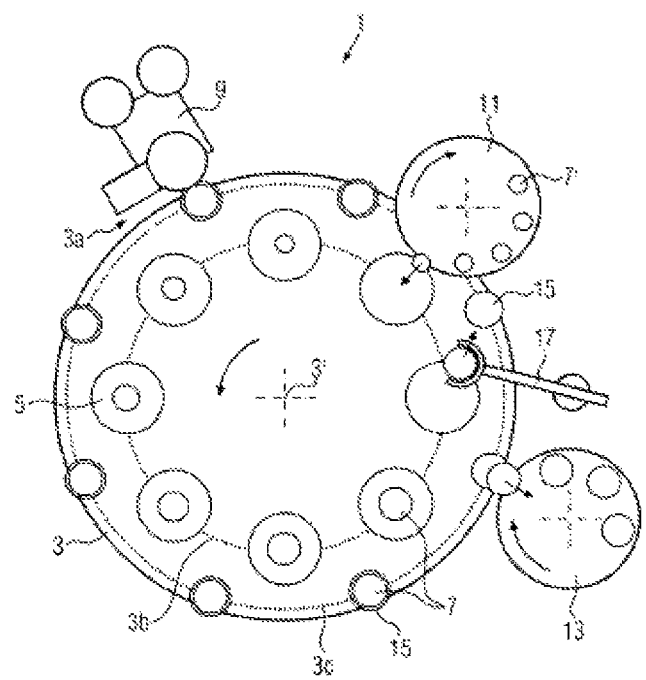

DEVICE AND METHOD FOR PRODUCING LABELED PLASTIC CONTAINERS

CROSS-REFERENCE TO PRIOR APPLICATIONS

This application is a U.S. National Phase application under 35 U.S.C. §371 of International Application No. PCT/EP2011/000125, filed on Jan. 13, 2011, and claims benefit to German Patent Application No. DE 10 2010 002 246.2, filed on Feb. 23, 2010. The International Application was published in German on Sep. 1, 2011 as WO 2011/103942 under PCT Article 21(2).

FIELD

The invention relates to a device for producing labeled plastic containers, and to a method for producing labeled plastic containers.

BACKGROUND

In the production of labeled plastic containers, such as for example PET bottles, the containers are usually first produced from preforms in a blow molding machine and subsequently transferred to a separate labeling machine. For the container transfer between the machines, infeed and discharge starwheels and a transport device must be provided, causing a considerable amount of required equipment and space. It is therefore desirable to reduce both the number of required units and the space required for the production of labeled plastic containers.

The approach for solving the problem described in WO 2008/116525 A3, i.e. to label the container already during blowing in the blow mold, involves the disadvantage that in this case, devices for providing and fixing the labels in the blow mold must be provided, leading to an undesired complexity of the blow mold. Moreover, the blow molds are each only suited for a few label types and sizes.

To do without a separate labeling unit, it is suggested as an alternative in DE 19806647 A1 to apply the label onto the preform and to introduce it into the blow mold together with the preform. In this case, however, when designing the label, one has to take into consideration that the latter will expand in the blow mold together with the preform. Moreover, in this case, too, the choice of label types is restricted, for example to wrap-around labels.

SUMMARY

In an embodiment, the present invention provides a device for producing labeled plastic containers. A blowing wheel includes a plurality of blow molds each being configured to mold one of the containers. A labeling device is disposed in a region of the blowing wheel and is configured to label the containers while the containers are circulating on the blowing wheel.

BRIEF DESCRIPTION OF THE DRAWING

The present invention will be described in even greater detail below based on the exemplary figure. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 shows a schematic plan view onto a device according to an embodiment of the invention.

DETAILED DESCRIPTION

The present invention recognizes a need to reduce the amount of required equipment and the required space for labeling and simultaneously ensure high flexibility in the selection of label types.

In an embodiment, the invention provides a device including a labeling device disposed in a region of a blowing wheel, such that the containers can be labeled while circulating on the blowing wheel. Accordingly, the blowing wheel additionally assumes a transport function to transport the fully blown containers to the labeling device. Thereby, a separate transport device between the blowing wheel and the labeling device becomes dispensable, as well as separate devices for the discharge of the containers from the blowing wheel and their infeed into the labeling device.

Preferably, the labeling device is disposed essentially stationarily in a circumferential edge region of the blowing wheel. Thereby, the blowing wheel can additionally be employed as a rotating container table to guide the molded containers along one or several labeling devices. Thereby, labeling devices or modules, respectively, as they are also used in conventional labeling machines, can be disposed next to the blowing wheel without major alterations.

A particularly advantageous embodiment of the device is designed such that the containers are each molded during a first circulation of the blowing wheel and labeled during a further, second circulation of the blowing wheel, the second circulation in particular directly following the first circulation. This permits to produce the containers during the first circulation essentially independent of labeling, i. e. without having to adapt the parameters for the molding of the container to subsequent labeling. For example, one can then provide essentially the same process angle for molding the containers as in a conventional blow molding machine without labeling function. Equally, the blowing wheel can rotate essentially at the same speed, so that the machine efficiency of the device does not have to be reduced due to the additional labeling function.

Preferably, rotatable retaining devices for the containers circulating at the blowing wheel are provided to rotate the containers essentially about their main axes during labeling and guide them along the labeling device. Thereby, the containers can be brought into an initial rotational position suited for labeling and be purposefully positioned and rotated at the labeling device during the labeling process.

In a particularly advantageous embodiment, the retaining devices are disposed on the blowing wheel further to the outside than the blow molds, in particular in azimuthal positions between the blow molds. Thereby, the containers are particularly well accessible for labeling. Moreover, the retaining devices can be arranged on the blowing wheel in a particularly space-saving manner. The introduction of the preforms into the blow molds and the withdrawal of the molded containers from the blow molds are then particularly easy.

Preferably, one cooling device is provided at each of the retaining devices for cooling the containers, in particular the bottom areas of the containers. By this, the residence time of the containers on the blowing wheel can be particularly efficiently utilized, or an additional device and additional time required for cooling can be saved. The molding point of the preform is located at the container bottom. This material accumulation must be cooled for a longer time so that the container bottom cannot arch when pressure is applied to the bottle (e.g. in the filler). At least one transfer device for transferring the containers from the blow molds to the retaining devices is preferably provided at the blowing wheel. This permits a quick and safe transfer of the containers from the blow molds to the retaining devices. The transfer device can be provided, for example, to rotate along between one blow mold and one retaining device each, but also stationarily, for example in the form of an additional transfer starwheel with controllable grippers.

In a particularly advantageous embodiment, a control unit for controlling the device is moreover provided, in particular for controlling the blowing wheel and the labeling device together. This permits a particularly effective and precise synchronization of the blow molding process and the labeling process. A common control moreover facilitates the communication between the functional units of the device and the operation of the device and leads to a reduction of the amount of equipment required and an increase in functional reliability.

In a particularly advantageous embodiment, an infeed starwheel for transferring container preforms to the blow molds and a discharge starwheel for removing the labeled container from the retaining devices are furthermore provided. Thereby, the device according to an embodiment of the invention can be easily integrated into a production plant for containers or into a filling line.

In another embodiment, the invention provides a method in which the containers are first produced on a blowing wheel and subsequently also labeled during a further circulation of the blowing wheel. By the molded containers remaining on the blowing wheel even during labeling, a separate transport device between the blowing wheel and the labeling device can be eliminated, and separate devices for the discharge of the containers from the blowing wheel and their infeed into the labeling device can also be eliminated.

The containers are preferably blown each in a first circulation of the blowing wheel and labeled in a subsequent second circulation of the blowing wheel. This permits a particularly efficient process. In particular, the containers can be produced during the first circulation of the blowing wheel without having to adapt the blowing parameters to subsequent labeling. For example, essentially the same process angle is then available for molding the container as in a conventional blow molding machine without labeling function. Equally, the molding of the containers and labeling can be accomplished with the same production performance as in case of molding and labeling in separate machines.

In a particularly advantageous embodiment, the containers, in particular the bottom areas of the containers, are cooled each in a second circulation of the blowing wheel. By this, the residence time of the containers on the blowing wheel can be particularly efficiently utilized, and additional time required for cooling can be avoided.

Preferably, the containers are, at least temporarily, rotated about their longitudinal axes before and/or during labeling. By this, the containers can be brought into an initial rotational position suited for labeling, and the labeling operation can be optimized.

A particularly advantageous embodiment of the method furthermore comprises the following steps: transferring preheated container preforms to the blow molds circulating along a first, in particular inner transport path of the blowing wheel; transferring the molded containers to retaining devices essentially circulating along a second, in particular outer transport path of the blowing wheel to guide the containers along a labeling device; and removing the labeled containers from the second transport path. By separate transport paths being provided for blowing and labeling the containers at the blowing wheel, both procedure steps can be carried out each separately during a separate circulation of the blowing wheel. This facilitates the combination of the blowing wheel with conventional labeling devices and a high machine efficiency.

The containers are preferably labeled by attaching a label and/or by direct printing. This permits a particularly versatile application of the method. Suited labels are, for example, labels from a reel and self-adhesive labels.

Accordingly, the device 1 according to an embodiment of the invention comprises: a blowing wheel 3 having a plurality of blow molding stations or blow molds 5, respectively, for producing plastic containers 7, for example PET bottles. In a circumferential edge region 3a of the blowing wheel 3, a preferably stationary labeling device 9 is furthermore provided, such as a labeling unit for wrap-around labels from the reel, a cold-setting adhesive labeling unit, a dispenser unit for self-adhesive labels, or a unit for cut-to-size wrap-around labels. The labeling device 9, however, can also be a unit for directly printing the containers 7. It is also conceivable to combine several ones of the above-mentioned units for labeling arbitrarily, in particular successively.

Furthermore, an infeed starwheel 11 for feeding preforms (container preforms) 7' into the blow molds 5, and a discharge starwheel 13 for discharging the fully molded and labeled containers 7 from the blowing wheel 3, are provided at the device 1.

Furthermore, retaining devices 15 for receiving the molded containers 7 are provided on the blowing wheel 3 so as to rotate along with it, the blow molds 5 moving along an inner transport path 3b about the axis 3' of the blowing wheel 3, and the retaining devices 15 moving along an outer transport path 3c. Thereby, the containers 7 held in the retaining devices 15 are particularly well accessible for labeling. The transport paths 3b, 3c are preferably arranged essentially concentrically with respect to each other.

As can be further taken from the figure, the blow molds 5 and the retaining devices 15 are preferably disposed offset with respect to each other and with respect to the rotation or machine angle of the blowing wheel 3, that means with respect to their azimuthal position on the blowing wheel 3. This permits a particularly space-saving arrangement of the blow molds 5 and the retaining devices 15 and facilitates the access to the blow molds 5, in particular through a space formed between two retaining devices 15 each. However, it would also be possible to arrange the blow molds 5 and the retaining devices 15 essentially in corresponding azimuthal positions.

The retaining devices 15 are preferably rotary about an axis parallel to the axis of rotation 3' of the blowing wheel 3 to rotate the containers 7 about their longitudinal axes, in particular against the sense of rotation of the blowing wheel 3. By this, areas of the containers 7 to be labeled can be oriented with respect to the labeling device 9 before and during labeling. The retaining devices 15 comprise, for example, rotary supporting disks and centering bells for fixing and rotating the containers 7. Such retaining elements are well-known from rotating container tables in labeling machines. For the drive of the retaining devices 15, for example motor-driven sprocket belts, star wheels and cam segments, or an individual drive with computer-controlled servomotors, are suited.

In the region of the mountings 15 or the transport path 3c, respectively, which are preferably circular, the blowing wheel 3 thus essentially fulfils the function of a container table of a separate labeling machine.

Furthermore, a transfer device 17 for transferring the molded containers 7 from the blow molds 5 to the retaining devices 15 is only schematically indicated in the figure. The transfer device 17 could be arranged both stationarily, for example in the form of an additional transfer starwheel with controllable grippers, and so as to rotate along on the blowing wheel 3. In the latter case, for example a movable gripper arm could be provided between one blow mold 5 each and the corresponding retaining devices 15. A transfer device 17 rotating along could be moved e. g. with the aid of control cams.

The infeed starwheel 11 is e. g. a transfer wheel of prior art for the infeed of preforms 7' into blow molding machines. Equally, the discharge starwheel 13 can be a conventional transfer wheel for discharging fully blown bottles out of blow molding machines.

By the blow molds 5 and the retaining devices 15 rotating along separate, preferably essentially concentric, transport paths 3b, 3c on the blowing wheel 3, the containers 7 can be molded during a first circulation of the blowing wheel 3 and labeled during the subsequent second circulation of the blowing wheel 3. By this, the actual blow-molding process can be accomplished during the first circulation of the blowing wheel 3 essentially as it is known from prior art, in particular utilizing the same process angle of the blowing wheel 3. The blow molds 5 are therefore only schematically indicated in the figure. Moreover, a representation of the opening and closing processes of the blow molds 5 has been omitted for a better overview.

To ensure the process angle and the process flow of a conventional separate blow molding machine in the molding of the containers 7, the transfer device 17 can be designed such that the transfer of the containers 7 from the blow molds 5 to the retaining devices 15 is done in a position that essentially corresponds to the position of the discharge of the containers 7 from the blowing wheel of a blow molding machine without labeling function. With the device 1 according to an embodiment of the invention, one can consequently essentially maintain a machine efficiency predetermined by the blow-molding process even after the integration of the additional labeling function.

During a second circulation of the blowing wheel 3, the fully blown container 7 can be labeled with one labeling device 9 or with several labeling devices 9. Moreover, a cooling can be provided at the retaining device 15, in particular for cooling the bottom areas of the containers 7, so that the time of the second circulation around the blowing wheel 3 can be utilized particularly effectively.

The position of the transport paths 3b, 3c with respect to each other is not restricted to the described advantageous embodiment. For example, the inner transport path 3b could be an upper transport path instead, and the outer transport path 3c could be a lower transport path, or vice-versa. It is decisive that separate transport paths 3b, 3c are provided for the blow molds 5 and the retainers 15, so that the molding of the containers 7 and the labeling of the containers 7 can be done during separate circulations of the blowing wheel 3.

The device 1 preferably comprises a controlling system for controlling the blowing process and the labeling process. A common control device that activates the blowing wheel 3, the transfer device 17, the retaining devices 15 and the labeling device 9 in a synchronized manner is particularly advantageous. By this, the communication between the individual functional units of the device 1 can be facilitated and particularly high operating facility and functional reliability can be ensured.

In the device 1 according to an embodiment of the invention, the blowing wheel 3 has an additional transport and orientation function for the containers 7, comparable to that of a container table of a separate labeling machine. By this, not only the container table and the separate labeling machine, respectively, can be eliminated, but also the additional transport and transfer devices otherwise necessary for the transfer of the fully blown containers 7 to the labeling machine. By this, a particularly simple device 1 for producing labeled containers 7 can be realized with particularly little space requirements.

The device 1 according to an embodiment of the invention can be used as follows:

A continuous stream of preheated preforms 7' is transferred to the continuously rotating blowing wheel 3 with the infeed starwheel 11. The preforms 7' are positioned in the opened blow molds 5 in a well-known manner and the blow molds 5 are closed. During a first circulation of the blowing wheel 3, the preforms 7' are molded into the containers 7 in a well-known manner by blow-molding or stretch-blow molding. Upon the production of the containers 7, towards the end of the first circulation, the blow molds 5 are opened again and the fully molded containers 7 are transferred from the transfer device 17 to one retaining device 15 each. During a further, second circulation of the blowing wheel 3, the containers 7 are brought into a rotational position suited for labeling by the retaining device 15, supplied to the labeling device 9 and, if required, also rotated during labeling. The labeling device 9 provides labels or an imprint (neither of them is represented) and labels or prints the containers 7 which are finally transported further by the blowing wheel 3 and discharged as a continuous product flow with the discharge starwheel 13.

Here, the blowing wheel 3 with the retaining devices 15 assumes the function of a container table of a separate labeling machine. It is therefore possible to label the containers 7 with a conventional labeling device 9, for example with a labeling unit for wrap-around labels from the reel. It is also conceivable to perform several labeling operations at different labeling devices 9 arranged one behind the other in the product flow during the second circulation of the blowing wheel 3. Here, it is advantageous, but not imperative, for the first and the second circulations of the blowing wheel 3 for molding or labeling the containers 7 to follow directly each other. Arbitrary interposed circulations for providing storage positions or transfer positions for the containers 7 on the blowing wheel 3 are conceivable as long as a continuous product flow remains ensured.

The method according to an embodiment of the invention can thus be particularly flexibly adapted to different containers 7 and different types of labels. By the provision of separate transport paths 3b, 3c for molding the containers 7 or for labelling the molded containers 7, it is possible to increase the residence time of the containers 7 on the blowing wheel 3 for labeling the containers 7 without thereby reducing the machine efficiency of the device 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the attached claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. A device for producing labeled plastic containers comprising:
    a blowing wheel including a plurality of blow molds each being configured to mold one of the containers; and
    a labeling device disposed in a region of the blowing wheel and configured to label the containers while the containers are circulating on the blowing wheel,
    wherein the device is configured to mold the containers during a first circulation of the blowing wheel and label the containers, using the labeling device, during a further, second circulation of the blowing wheel.

2. The device according to claim 1, wherein the labeling device is disposed essentially stationarily in a circumferential edge region of the blowing wheel.

3. The device according to claim 1, further comprising at least one transfer device disposed at the blowing wheel and configured to transfer the containers from the blow molds to retaining devices.

4. The device according to claim 1, further comprising a control unit configured to control the blowing wheel and the labeling device together.

5. The device according to claim 1, further comprising an infeed starwheel configured to transfer container preforms to the blow molds and a discharge starwheel configured to withdraw the containers that have been labeled from the retaining devices.

6. A method of producing labeled plastic containers comprising:
    producing the containers on a blowing wheel; and
    labeling the containers on the blowing during a further circulation of the blowing wheel after the producing,
    wherein the producing is performed by blowing the containers during a first circulation of the blowing wheel, and wherein the labeling is performed during a subsequent, second circulation of the blowing wheel.

7. The method according to claim 6, further comprising cooling at least bottom areas of each of the containers during the second circulation of the blowing wheel.

8. The method according to claim 6, further comprising rotating, at least temporarily, the containers about a respective main axis of each of the containers at least one of before the labeling and during the labeling of a respective one of the containers.

9. The method according to claim 6, further comprising:
    transferring preheated container preforms to blow molds circulating along a first transport path of the blowing wheel;
    transferring the containers that have been molded in the blow molds to retaining devices essentially circulating along a second transport path of the blowing wheel so as to guide the containers along a labeling device; and
    withdrawing the containers that have been labeled from the second transport path.

10. The method according to claim 9, wherein the first transport path is an inner transport and the second transport path is an outer transport path disposed further to an outside of the blowing wheel than the first transport path.

11. The method according to claim 6, wherein the labeling is performed by at least one of attaching a label and direct printing.

12. A device for producing labeled plastic containers comprising:
    a blowing wheel including a plurality of blow molds each being configured to mold one of the containers;
    a labeling device disposed in a region of the blowing wheel and configured to label the containers while the containers are circulating on the blowing wheel; and
    rotary retaining devices configured to rotate the containers circulating on the blowing wheel essentially about a respective main axis of each of the containers during labeling and to guide the containers along the labeling device.

13. The device according to claim 12, wherein the labeling device is disposed essentially stationarily in a circumferential edge region of the blowing wheel.

14. The device according to claim 12, wherein the retaining devices are disposed on the blowing wheel further to an outside of the blowing wheel than the blow molds.

15. The device according to claim 14, wherein the retaining devices are disposed on the blowing wheel in azimuthal positions between the blow molds.

16. The device according to claim 12, further comprising a cooling device disposed at each of the retaining devices so as to cool at least bottom areas of the containers.

17. The device according to claim 12, further comprising at least one transfer device disposed at the blowing wheel and configured to transfer the containers from the blow molds to the retaining devices.

18. The device according to claim 12, further comprising a control unit configured to control the blowing wheel and the labeling device together.

19. The device according to claim 12, further comprising an infeed starwheel configured to transfer container preforms to the blow molds and a discharge starwheel configured to withdraw the containers that have been labeled from the retaining devices.

* * * * *